June 2, 1925.                                        1,540,621
M. HANSON ET AL
ANT POISON RECEPTACLE
Filed Oct. 16, 1923
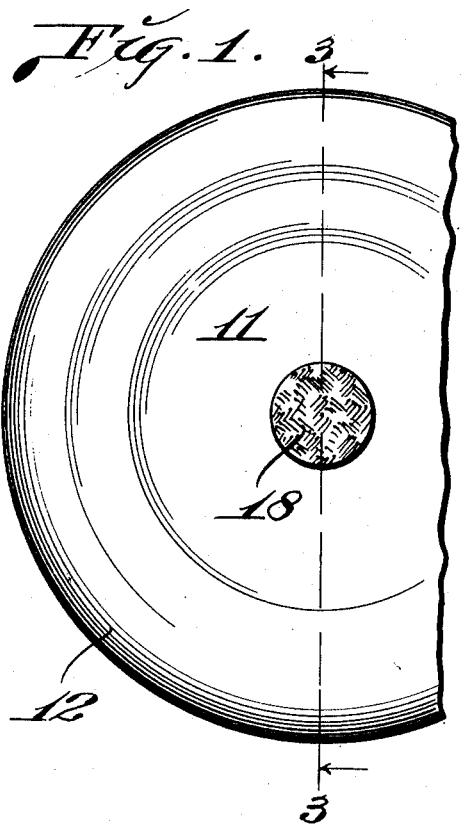
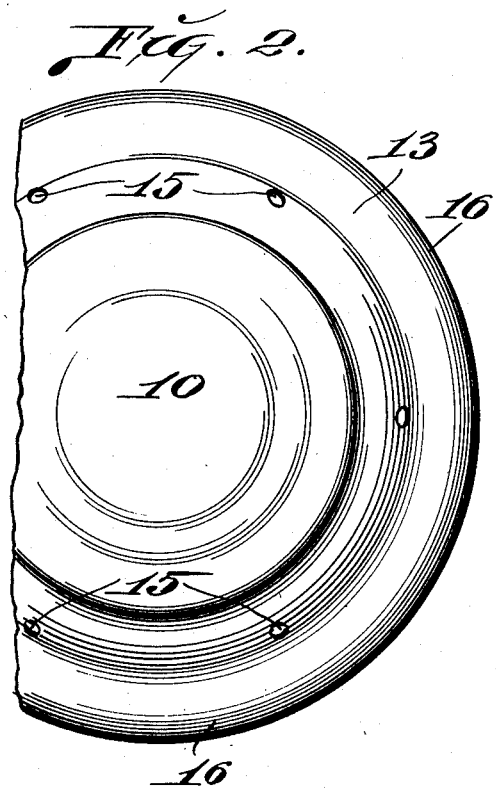
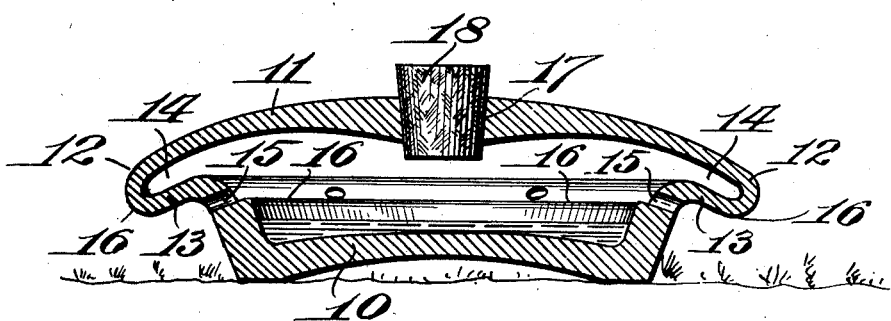
Inventors,
Mons Hanson and
Eben C. Hanson.
By Martin C. Smith, Atty.

Patented June 2, 1925.

1,540,621

UNITED STATES PATENT OFFICE.

MONS HANSON AND ELBEN C. HANSON, OF LOS ANGELES, CALIFORNIA.

ANT-POISON RECEPTACLE.

Application filed October 16, 1923. Serial No. 668,839.

*To all whom it may concern:*

Be it known that we, MONS HANSON and ELBEN C. HANSON, citizens of the United States, residing at Los Angeles, in the county of Los Angeles and State of California, have invented certain new and useful Improvements in Ant-Poison Receptacles, of which the following is a specification.

Our invention relates to a receptacle that is particularly designed for containing a liquid lure and poison that is effective in the extermination of ants and the principal objects of our invention are, to provide an ant poison container that is of relatively simple one-piece structure, and capable of being easily and cheaply produced; to provide a receptacle or container of the character referred to that will not permit the liquid lure and poison to spill or escape in the event that the receptacle is overturned, or if it should be picked up by a child or animal; to construct the receptacle and the ant inlet openings so as to minimize the possibility of water entering the chamber within said container to mix with and spoil the liquid poison and, further, to arrange within the receptacle, a ledge or shoulder, that serves as a resting place or vantage point from which the ants may readily reach and eat or take up the liquid lure and poison.

With the foregoing and other objects in view, our invention consists in certain novel features of construction and arrangement of parts that will be hereinafter more fully described and claimed and illustrated in the accompanying drawings, in which:

Fig. 1 is a top plan view of a poison receptacle of our improved construction with a part thereof broken away.

Fig. 2 is a view looking against the underside of the receptacle with a part broken away.

Fig. 3 is a section taken on the line 3—3 of Fig. 1.

Our improved receptacle is preferably formed of burnt or baked earthenware, having a glazed surface and said receptacle comprises a shallow pan or saucer like base 10 and a top or covering member 11.

This stop or covering member 11 is convex in cross section and, in diameter it is slightly greater than the base 10.

The marginal edge 12 of the top or covering member is curved downwardly and its lower edge is directly connected to the upper edge of the body of base 10, by a relatively short inwardly and upwardly extending wall 13.

This wall is spaced apart from the adjacent portion of the top 11 so as to form a narrow annular space or pocket 14 that extends entirely around the receptacle.

This pocket is intended to receive the liquid lure and poison, in the event that the device is turned upon its edge.

Formed through the upper portion of the side wall of the body 10 of the receptacle and directly below the inner end of wall 13 is a series of small apertures 15, through which ants may pass to the poison chamber within the receptacle.

These apertures are preferably inclined from their outer ends inwardly, so as to minimize the possibility of any flow or passage of water from the exterior of the receptacle to the chamber therein.

The extreme marginal portion of the downwardly turned edge 12 that unites with the outer edge of inclined wall 13 provides a depending flange or lip 16, from which water will drip onto the ground or floor instead of flowing inwardly along the underside of wall 13 and into and through apertures 15.

Formed on the inner face of the side wall of base 10 and in a plane directly below the apertures is a flange or shoulder 16, to which the ants may cling while taking up the poisonous liquid contained in the shallow base 10.

Formed in the central portion of the top 11 is an aperture 17, through which the liquid lure and poison is introduced into the receptacle and normally closing this aperture, is a plug or stopper 18, preferably of cork.

In the use of our improved device, a small amount of liquid lure and poison is placed in the shallow base 10 and said device placed on the ground or floor.

Ants attracted by the lure, will crawl up the side of the base, pass through the apertures 15 and, standing upon or clinging to the flange or shoulder 16, will partake of the liquid, and the poison in the latter will in a short time take effect and kill the ants.

Thus it will be seen that we have provided an ant poison container that is relatively simple in structure, capable of being easily and cheaply produced and which is very effective in performing its intended functions.

Obviously the size, form and details of construction of our improved ant poison receptacle may be varied slightly from those herein shown and described without departing from the spirit of our invention, the scope of which is set forth in the appended claims.

We claim as our invention:—

1. An ant poison receptacle comprising a shallow pan-like base having ant passageways formed in the upper portion of its side wall, a top having a chambered marginal portion that overhangs said ant passageways, and a ledge formed on the inner face of the side wall of the base below said ant passageways.

2. An ant poison receptacle comprising a shallow pan-like base having ant passageways formed in the upper portion of its side wall, a ledge formed within said base below said passageways, a top for said base, which top is provided with an overhanging marginal lip.

In testimony whereof we affix our signatures.

MONS HANSON.
ELBEN C. HANSON.